(No Model.)
H. BORNSTEIN.
WRENCH.
No. 479,698. Patented July 26, 1892.
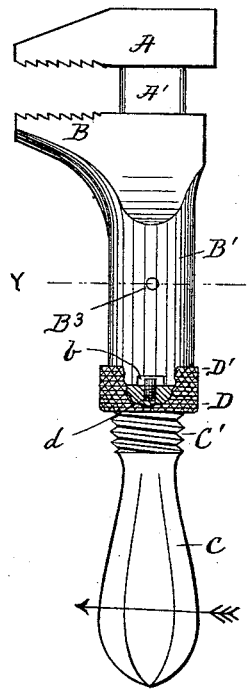
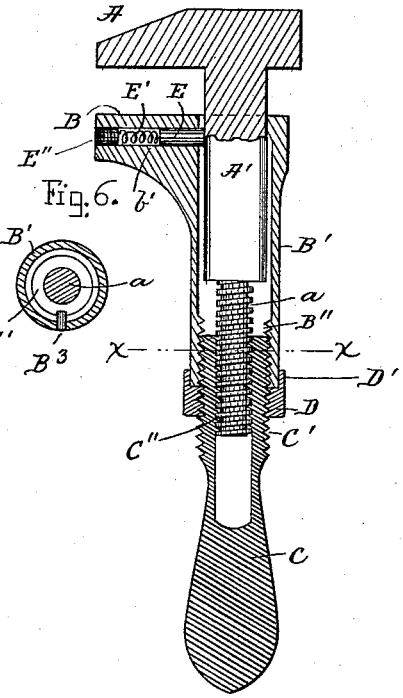
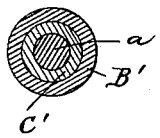
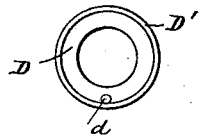
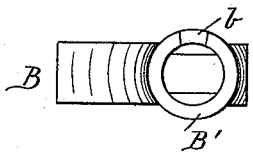
Witnesses.
Lauritz W. Möller.
Joseph F. Hopkins.
Inventor
Henry Bornstein.
by his atty.

UNITED STATES PATENT OFFICE.

HENRY BORNSTEIN, OF BOSTON, ASSIGNOR OF ONE-HALF TO JOHN A. W. SEABERY, OF MALDEN, MASSACHUSETTS.

WRENCH.

SPECIFICATION forming part of Letters Patent No. 479,698, dated July 26, 1892.

Application filed January 28, 1892. Serial No. 419,520. (No model.)

*To all whom it may concern:*

Be it known that I, HENRY BORNSTEIN, a citizen of the United States, and a resident of Boston, in the county of Suffolk and State of Massachusetts, have invented new and useful Improvements in Pipe and Nut Wrenches, of which the following, taken in connection with the accompanying drawings, is a specification.

This invention relates to improvements on the invention set forth in Patent No. 434,912, granted to me August 26, 1890, for wrenches, and it is carried out as follows, reference being had to the accompanying drawings, wherein—

Figure 1 represents a side view of the improved wrench, showing a portion of the check-nut in section. Fig. 2 represents a longitudinal section of the same. Fig. 3 represents a cross-section on the line X X, shown in Fig. 2. Fig. 4 represents a top view of the check-nut. Fig. 5 represents an end view of the lower-jaw sleeve; and Fig. 6 represents a cross-section on the line Y Y, shown in Fig. 1.

Similar letters refer to similar parts wherever they occur on the different parts of the drawings.

A and B represent, respectively, the upper and lower jaws of the wrench, the former having a shank A', guided in a perforation in the jaw B and terminating in its lower end as a screw-threaded spindle $a$, as shown.

B' is a downwardly-projecting cylindrical sleeve made in one piece with the jaw B, and it serves to inclose the shank A' and its screw-threaded spindle $a$, so as to prevent dust, grit, or dirt from getting in and between the working parts. The lower end of said sleeve B' has an interior screw-thread B'', in which is adjustable the screw-threaded shank C' of the handle C, which latter is preferably made polygonal, as shown in Fig. 1. The shank C' has an interior screw-thread C'', adapted to receive the screw-threaded spindle $a$ of the jaw A, as shown in Fig. 2.

A pin or projection B³ is secured to the sleeve B', and it projects inward into said sleeve for the purpose of serving as a stop or limit pin against the upper end of screw-threaded shank C', by which the expansion of the jaws is limited, thus preventing the said jaws from being entirely detached from each other while used. The screw-threads on the spindle $a$ and shank C' are of opposite pitch—that is, one is a right one and the other a left one—so as to cause a quick movement of the jaws to and from each other by turning the handle C around its axis.

D is a cup-shaped check-nut on the shank C', and it has in its upper end an annular flange D', adapted to receive and inclose with a desired friction the lower end of the sleeve B', so as to prevent dust and dirt from entering at this place. The said check-nut is limited in its rotation by means of a pin or projection $d$, secured to it and working in a recess or cut-away portion $b$ in the lower end of the sleeve B', as shown in Figs. 1, 4, and 5. The jaws are adjusted to and from each other simply by turning the handle C to the right or left, as the case may be, and by a slight turning motion of the check-nut D the said jaws will be firmly held and secured in such desired position.

By making the jaw B with an inclosing sleeve B', as shown and described, the screw-threaded working parts of the wrench are entirely protected from dust and grit and the body of the wrench is rendered smooth, so as to enable the operator to grasp it without coming in contact with the interior working parts. By means of such inclosing sleeve the strength of the wrench is materially increased. By having the pin B³ secured to the sleeve B' and projecting inwardly therein, as shown, it affords no obstruction to the operator in manipulating the wrench.

The faces of the jaws A and B may be smooth or serrated, as may be desired, according to the use for which the wrench is intended. The improved wrench may be used for holding and turning nuts, pipes, rods, &c., or any other objects, and it may also to advantage be used as a vise for holding any objects between its jaws. A slight turning movement of the handle causes a powerful grip to be quickly exerted on the object held between the jaws, which can as quickly be released simply by turning the handle slightly in an opposite direction.

In pipe-wrenches it is desirable that the shank of the jaw A should be at liberty to yield in its bearing in the jaw B, so as to cause a powerful grip to be given to the object that is being grasped and held between the jaws, and for this purpose I make a horizontal perforation $b'$ in the jaw B, containing a yielding pin E, which is held against the shank $A'$ by the influence of a spring $E'$, located in the perforation $b'$, between the pin E and a screw-threaded plug $E''$, screwed into the outer end of said perforation $b'$, as fully shown in Fig. 2. The plug $E''$ is adjustable in the screw-threaded outer end portion of the perforation $b'$, and consequently the tension of the spring can be increased or diminished by screwing the plug inward or outward, and, furthermore, the pin E and spring $E'$ can be conveniently removed and replaced by detaching the screw-threaded plug.

The spring $E'$ and its pin E serve the purpose of normally holding the back of the shank $A'$ against the rear of the recess or guide-perforation in the jaw B, as shown in Fig. 2, said recess being somewhat wider than the shank, so as to allow the latter to yield laterally against the influence of the spring $E'$ when a pipe or similar object is grasped between the jaws and the handle C moved in the direction of the arrow shown in Fig. 1. To allow for such lateral yielding movement of the shank $A'$, I make its screw-spindle $a$ slightly loose-working in the screw-thread $C''$ in the handle C.

Having thus fully described the nature, construction, and operation of my invention, I wish to secure by Letters Patent and claim—

The combination, with the jaw A, having a smooth shank $A'$, provided with a screw-threaded spindle $a$, of the jaw B, formed integral with the sleeve $B'$, having at its lower end the recess $b$, the handle C, screwed into the recessed end of the sleeve and engaging the threaded spindle of the smooth shank, and the check-nut D, provided with a pin $d$ and formed integral with an annular flange $D'$, which receives and incloses the recessed end of the sleeve to prevent dust and dirt entering at this point, said pin on the check-nut entering the recess in the lower end of the sleeve, substantially as and for the purposes described.

In testimony whereof I have signed my name to this specification, in the presence of two subscribing witnesses, on this 11th day of January, A. D. 1892.

HENRY BORNSTEIN.

Witnesses:
ALBAN ANDRÉN,
ALICE A. PERKINS.